US006621177B2

(12) United States Patent
Westcott

(10) Patent No.: US 6,621,177 B2
(45) Date of Patent: Sep. 16, 2003

(54) PUBLIC TRANSPORTATION SIGNALING DEVICE

(75) Inventor: Sean G. Westcott, Eugene, OR (US)

(73) Assignee: Stellar Technologies, LLC, Boise, ID (US)

( * ) Notice: Subject to any disclaimer, the term of this patent is extended or adjusted under 35 U.S.C. 154(b) by 0 days.

(21) Appl. No.: 10/033,698

(22) Filed: Dec. 26, 2001

(65) Prior Publication Data

US 2002/0145540 A1 Oct. 10, 2002

Related U.S. Application Data

(63) Continuation-in-part of application No. 09/510,461, filed on Feb. 22, 2000, now Pat. No. 6,355,989.

(60) Provisional application No. 60/121,613, filed on Feb. 25, 1999.

(51) Int. Cl.[7] .................. B60L 3/00

(52) U.S. Cl. .................. 307/10.1; 362/731

(58) Field of Search .................. 307/12.1, 9.1, 307/101; 340/992, 993, 994; 323/318, 349; 362/464, 145, 147, 152, 431

(56) References Cited

U.S. PATENT DOCUMENTS 4,037,195 A * 7/1977 Wojslawowicz
4,325,057 A 4/1982 Bishop .................. 340/539
5,559,509 A 9/1996 Ogle .................. 340/944
5,734,339 A 3/1998 Ogle .................. 340/944
5,774,072 A 6/1998 Wu .................. 340/994
6,355,989 B1 * 3/2002 Westcott .................. 307/10.1
2001/0037174 A1 11/2001 Dickerson .................. 701/200

OTHER PUBLICATIONS

SOL (R) Solar Outdoor Lighting, Inc. Brochure for Onmilight tm Bus Stop Safety Light, no date.

* cited by examiner

*Primary Examiner*—Edward H. Tso
(74) *Attorney, Agent, or Firm*—Robert L. Shaver; Frank J. Dykas; Stephen M. Nipper

(57) ABSTRACT

A bus driver signaling device wherein a user is able to push a button to activate a light source signal at a bus stop. Pushing the button creates a light signal able to be viewed by the bus driver, thereby signaling the bus driver that a passenger is awaiting the bus driver at the bus stop.

17 Claims, 5 Drawing Sheets

PUBLIC TRANSPORTATION SIGNALING DEVICE

CROSS REFERENCE TO RELATED APPLICATIONS

This application is a continuation-in-part of, and claims priority from, application Ser. No. 09/510,461, filed Feb. 22, 2000 now U.S. Pat. No. 6,355,989 which itself claims the priority of U.S. Provisional Application No. 60/121,613 filed Feb. 25, 1999, the disclosures of which are incorporated by reference.

BACKGROUND OF THE INVENTION

Generally, the present invention relates to public transportation, and more specifically to manners of signaling an approaching bus driver of the intent to be a passenger on the bus driven by said bus driver.

In public transportation, a bus route is typically made up of a number of bus stops. It is common for a bus driver, in an attempt to canvas the bus route in an efficient manner, to not stop at bus stops, which have no apparent waiting passengers. Likewise, if an individual is standing at or near a bus stop the bus driver must assume that the individual is a passenger and the driver will stop at the bus stop. If the individual is not a passenger, then the bus driver made a stop he/she did not need to make.

A problem with this prior art public transportation method arises particularly during inclement weather. In such a case, passengers waiting to be picked up at an unsheltered bus stop may huddle in out-of-sight doorways adjacent the bus stop, under shop awnings, around the corner of a building to get out of wind, or other locations. In such instances, if the passengers do not see the approaching bus in time to move to the actual bus stop for the bus driver to see them and stop, the bus driver may pass by the bus stop, leaving the passengers behind. Transit agencies expect the passengers to "notify" the driver that they are present and would like to board the bus by waving their hands or raising a hand or something of that fashion. The device of the invention is simply an emphasized extension of waving a hand, and agencies automatically identify the value of the TranSignal.

What is needed is an apparatus and/or method whereby passengers can signal to the bus driver that they want the bus driver to stop at the bus stop. This would make the route more efficient for the driver, and passengers would not be left at pickup locations. The device would be easier to be implemented if it was a stand-alone unit, to minimize the installation expense. The present invention solves this need.

SUMMARY OF THE INVENTION

The present invention is a device used for signaling bus drivers at a bus stop that a passenger is present and waiting for the driver to stop in order to allow the passenger to board the bus for transportation. The invention can also be used for signaling other public transportation vehicles, such as taxis. Such a use would be useful in having a taxi wait away from an air terminal exit until a passenger indicates a need for a taxi. The present invention is particularly useful during inclement weather when passengers huddle in out-of-sight doorways, around corners of buildings, under adjacent building awnings, during the nighttime, and/or where a passenger is standing in a position that wrongly indicates to the driver that they are not a passenger. Transit districts increasingly receive complaints that buses have passed by a person standing at or near a marked bus stop and have been searching for simple, inexpensive solutions to solve this problem.

In one embodiment of the present invention, the signaling device of the invention includes a tubular post member (housing), a signal light subassembly located within the post adjacent its upper end, wherein the signal light of the signal light subassembly communicates with the exterior of the post through an opening therein; a power source; an activation switch subassembly; and wiring electrically connecting the signal light, the power source, and the switch subassembly in a manner adapted to allow the signal light to be activated upon depressing of the switch.

It is an object of this invention to provide a simple and inexpensive signaling device for use in public transportation systems.

It is a further object of this invention to provide a simple and inexpensive bus signaling device for use at bus stops.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive.

DESCRIPTION OF PREFERRED EMBODIMENTS

Figure 1:
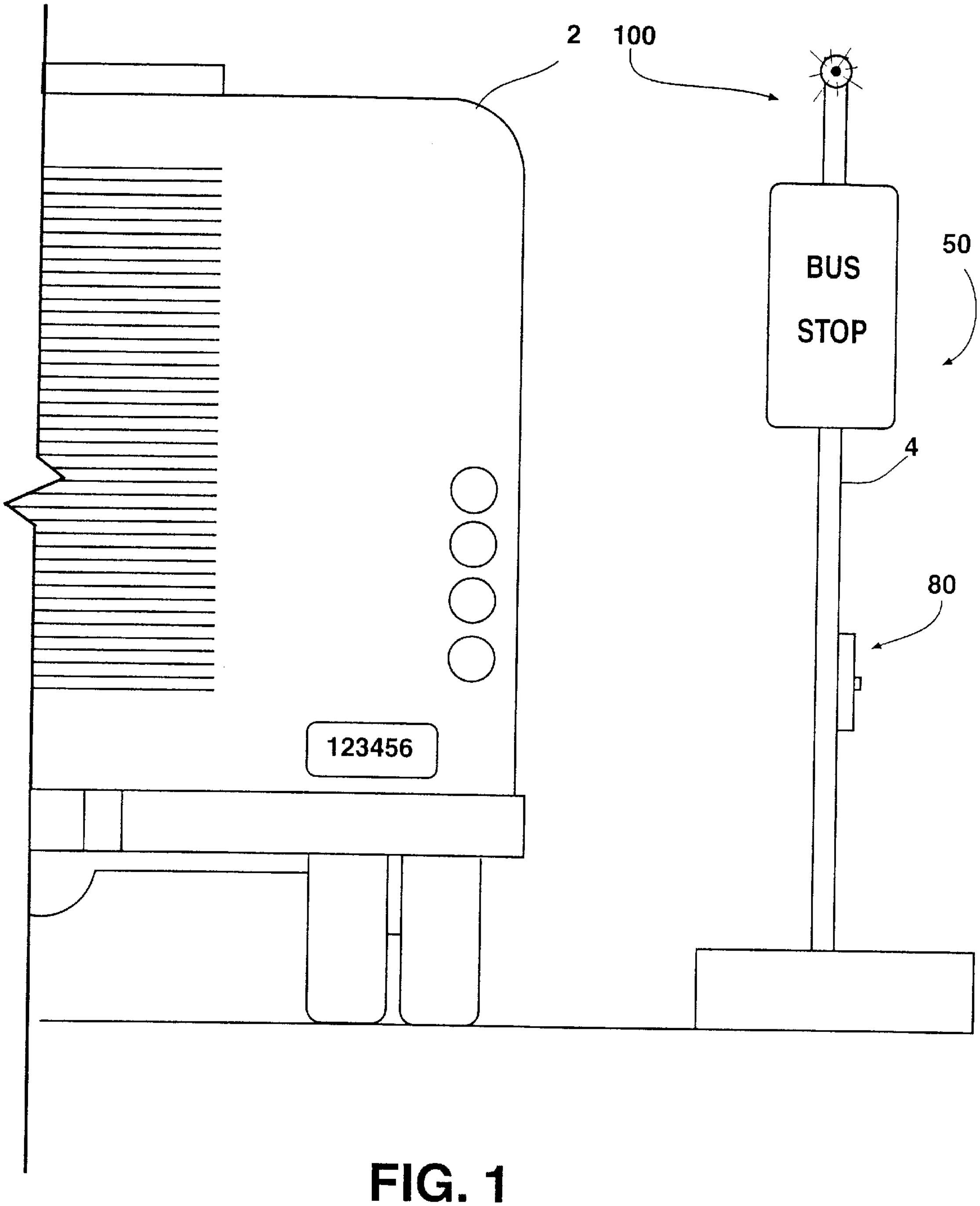
FIG. 1 is an environmental view of one embodiment of the present invention.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims. For instance, this disclosure's use of "bus driver" and other "bus" related terms is not intended to limit the application of the present invention to use with public transportation buses, but is instead done for clarity and the convenience of the reader of this disclosure.

Referring initially to FIG. 1, one embodiment of the signaling device of the invention 50 is shown. This embodiment is shown installed at a bus stop 4 with a signal unit 100 having a flashing light facing the front of the approaching bus so that the driver of said bus 2 could see the light. It is preferred that the signal unit's flashing light face the direction of approaching traffic and be elevated above the roadway to increase its visibility to such a driver. An activation unit 80, such as a button or switch, allows a passenger to activate the signaling device 50.

Figure 2:
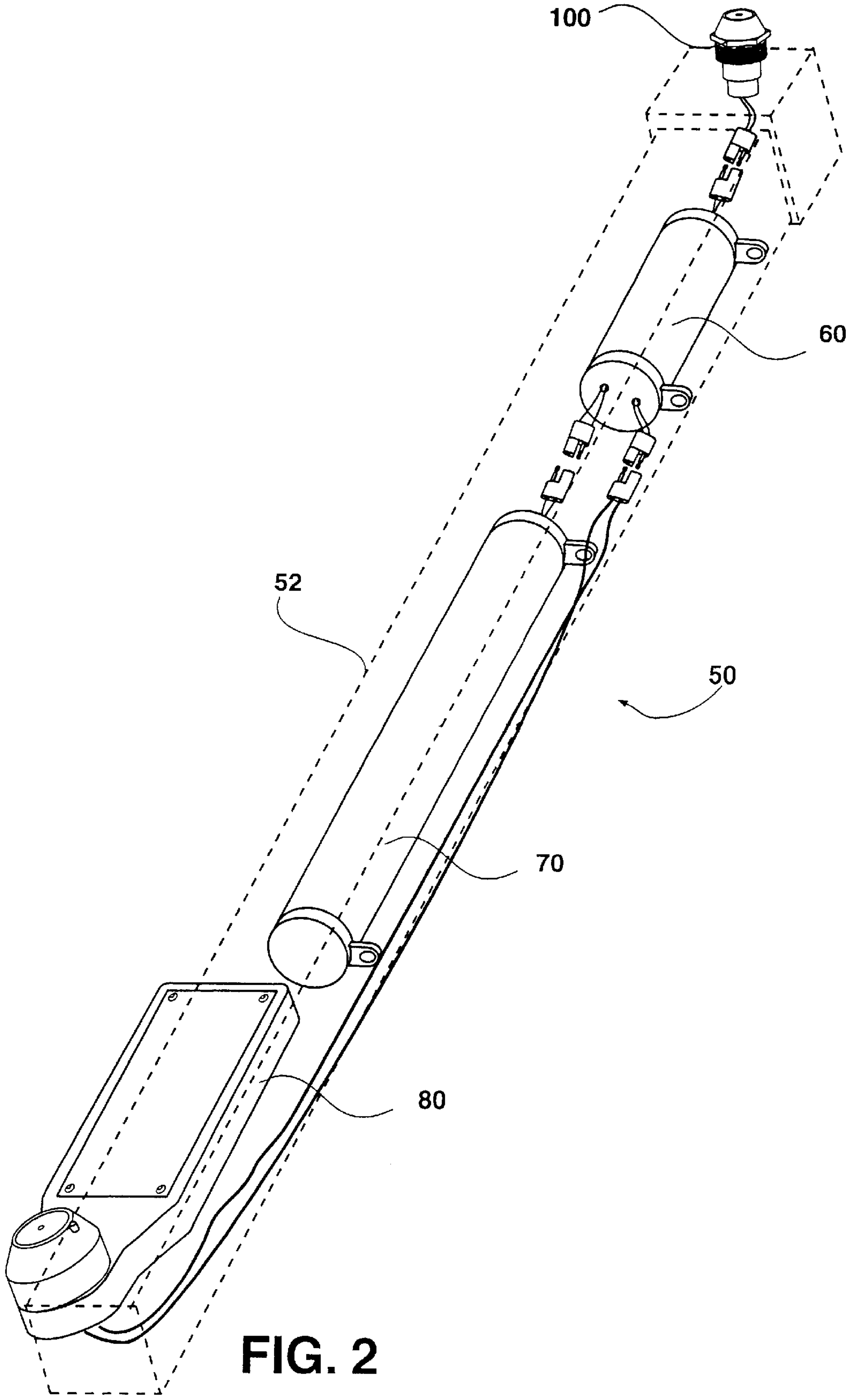
FIG. 2 is a perspective view of a second embodiment of the present invention.

Referring now to FIG. 2, there is shown the preferred embodiment of the present invention. The present invention is a signaling device 50 for signaling the driver of a bus, or other transportation system (i.e. taxis, etc.) that a passenger is present and waiting for pickup.

Such a signaling device 50 would preferably be mounted within a housing 52 which is mounted to or placed adjacent to a bus stop or other location where passengers await pickup. The preferred housing is a length of 2-inch by 2-inch tubular steel. The tubing may be round or square in cross section, or octagonal, hexagonal, etc. The housing may be provided with the present invention, or may be an existing bus stop structure, for instance the "Bus Stop" pole shown in FIG. 1 or the side of a bus shelter. The length (as well as size, shape, etc.) of the housing shown in FIG. 2 is not intended to be a limitation, in that the housing may be any necessary length. Likewise, the orientation and location of components upon or within the housing 52 of FIG. 2 are not intended as a limitation. It is preferred that the signaling device 50 be mounted in a manner that protects the device and results in a watertight connection, thereby protecting the device from environmental damage.

One of the benefits of the preferred embodiment of the present invention is the fact that the device 50 is self-contained within a housing 52 with the exception of the activation unit 80, which obviously must be able to be activated by the user, and the signal means 100, which may or may not need to be located outside the housing 52. In such a manner, utilization of the present invention is as simple as installing the housing 52 at the bus stop, or in embodiments where a housing is not provided, installing the components of the device 50 within and or upon an existing housing or structure at the bus stop.

The device 50 can be installed at a public transportation stop by any suitable means, for instance, by burying one end of the housing 52 in the ground, or by attaching one end of the housing 52 to a concrete footing by means of nuts and bolts. Alternatively, the device 50 can be inserted into and attached to an existing "Bus Stop" pole, as shown in FIG. 2. However the device 50 is installed, it has been found to be desirable that the signal light 104 portion of the device 50 be located at or around nine (9) feet above ground level for bus signaling applications.

This embodiment of the signaling device 50 contains four main subcomponents. A control unit 60 for controlling the operation of the device, a power unit 70 for supplying electrical power to the electrical components of the present invention, an activation unit 80 for allowing a user to operate the present invention, and a signal unit 100 for display of a signal to a bus operator thereby notifying a bus operator that a user is awaiting pickup. Such components may be separate, as shown, may be combined together into fewer components (for instance the control unit and activation unit could be integrated together), or may be divided into further subcomponents. It is preferred that these various units (subcomponents) be independent and modular so that repair and replacement of a defective unit can be easily accomplished. Thus, in case of vandalism or environmental damage, the device can be inexpensively and quickly repaired and returned to service by replacing the damaged or defective component.

Figure 3:
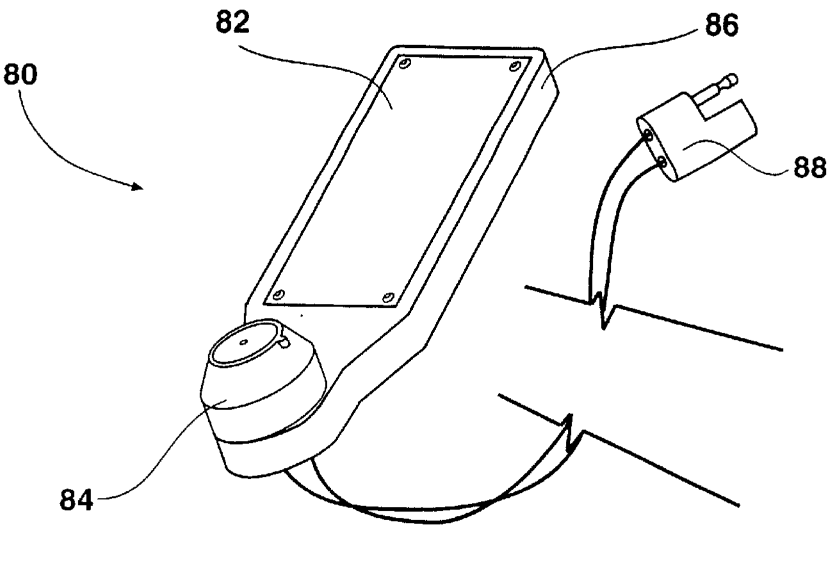
FIG. 3 is perspective view of one embodiment of an activation unit utilized with the present invention.

Referring now to FIG. 3, one embodiment of the activation unit 80 utilized with the present invention is shown. This embodiment shows an activation unit 80 having a means of actuating ("hail button") 84 adjacent to a faceplate 82. The faceplate 82 is optional. If present, this faceplate 82 will preferably contain directions or instructions on operation of the device, may be lighted, and may contain Braille directions for visually impaired passenger convenience, etc. It is preferred that this faceplate and hail button be contained within or attached to a removable housing 86. This allows the activation unit 80 to be separately mounted as the operator wishes, and allow for easy removal for maintenance and repair purposes. In use, the housing 86 could be mounted wherever convenient for passengers at the bus stop, including adjacent to the remainder of the signaling device, or even spaced therefrom, depending upon the wants and needs of the operator.

This embodiment of activation unit 80 shows use of an electrical connection 88 for connection with other components in the signaling device. The connections shown are quick snap style electrical connectors which are able to be easily and correctly engaged and disengaged. Other types of connections are also envisioned, including but not limited to twisted wire connections. In the preferred embodiment, the activation unit electrical connection 88 mates with an electrical connection 64 extending from the control unit 60. The preferred electrical connectors for this embodiment are two pole polarized electrical connectors having two mating jacks or plugs, which may be pulled apart and connected together easily. While this is the preferred embodiment, other means of operable connecting the various components are also envisioned including, but not limited to the use of radio signals.

Various different types of means of actuation 84 may be used in place of the push-type hail button shown, including toggle switches, cameras, motion sensors, infra-red heat detectors, and any other means and/or manners of actuating the device. However, the preferred embodiment uses a push-type button 84 which can be depressed or activated by the person awaiting pickup. Preferably, the button 84 will be located at an appropriate height for easy handicap access, e.g., about four feet from ground level. A suitable push button switch is manufactured by Selecta Switch as part number AV191003C940N. Optionally, more than one activation unit may be present at a single bus stop. For instance, one may be mounted in a standard manner, and a second mounted for easy access by handicapped individuals.

Figure 4:
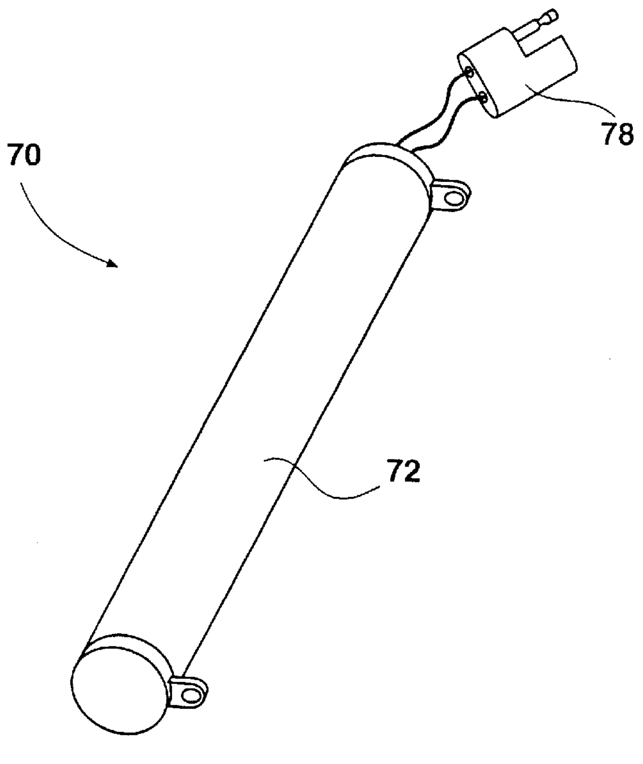
FIG. 4 is a perspective view of one embodiment of a power unit utilized with the present invention.

Referring now to FIG. 4, shown is one embodiment of a power unit 70 for use with the present invention. This embodiment of the power unit 70 comprises a case 72 for containing therein a number of standard dry cell batteries, i.e., standard "AA," "D", "C", size alkaline batteries. For instance six (6) "C-size" batteries could be placed in series within the case 72 using spring contacts in a standard manner. Alternatively, other types of batteries could be used, including but not limited to: lithium ion, lithium polymer, nickel cadmium, nickel metal hydride, other rechargeable batteries, gel cell batteries, and sealed lead batteries. Optionally, a solar panel could be used in conjunction with the battery pack to keep the batteries charged.

In such an embodiment, these batteries would be electrically connected to an electrical connection 78 extending from said power unit 70. This electrical connection 78 being able to supplying power to the rest of the signaling device 50. It is preferred that the electrical connection 78 mate with an electrical connection 66 extending from the control unit 60.

By having a separate power unit 70, when the batteries within the power unit become depleted, a user merely needs to disconnect the power unit 70 and replace it with a new power unit containing a fresh supply of batteries. Alternatively, the case 72 may be able to be opened so that a maintenance worker could merely remove the depleted batteries and insert new batteries, close the case, and reinstall the power unit 70 within the signaling device 50.

While the preferred power unit 70 is a dry cell battery pack, other means (or combinations of means) of supplying an electrical current to the present invention are also envisioned. For instance, solar panel(s), alternating current (AC) electrical connections, etc. In such embodiments, these electricity sources could serve as the "power unit."

Figure 5:
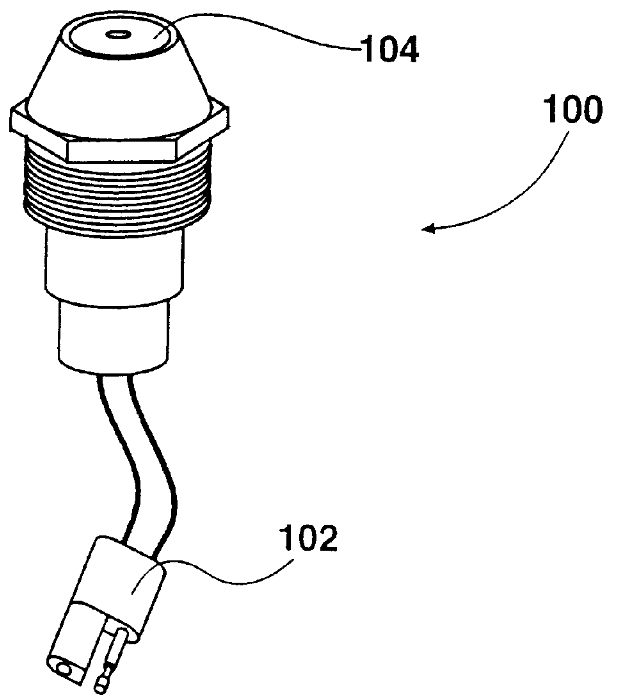
FIG. 5 is a perspective view of one embodiment of a signal unit utilized with the present invention.

Referring now to FIG. 5, shown is one embodiment of the signal unit 100 utilized with the present invention. This embodiment of the signal unit 100 utilizes at least one light 104, or other type of signaling means, electrically connected through electrical connection 102 with the rest of the invention. In the preferred embodiment, this electrical connection is able to attach to a mating connection 62 extending from the control unit 60.

Preferably, for protection and appearance, the electrical circuitry associated with the signal light is enclosed within the housing 52. As installed, the signal light 104 is preferably located facing oncoming traffic so as to be visible to the bus driver approaching the stop where the signaling device 50 is located. The signal light 20 may be installed on the outside of the housing 52, be flush with the outside of the housing, or be recessed within the housing having a port or other means for viewing the light therethrough.

The preferred signal light 104 is a light emitting diode (LED). An example of a suitable LED is manufactured by Selecta Switch as part number SL-AO5015CI. However, any suitable signal light means are also possible, including, but not limited to incandescent lights, florescent lights, lasers, plasma, neon, and other means of illumination. Because LEDs do not require very much electricity to operate, the use of LEDs allows the present invention to have minimal power requirements. It is estimated that normal use of the present invention will result in a 4–5 year power unit (battery embodiment) lifespan.

Figure 6:
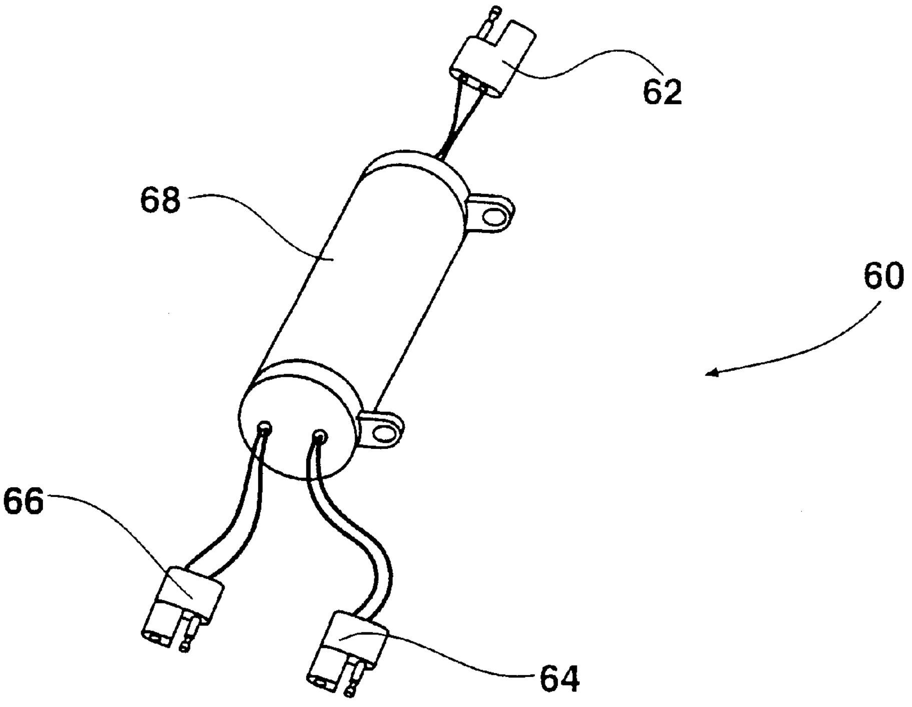
FIG. 6 is a perspective view of one embodiment of a control unit utilized with the present invention.

Referring now to FIG. 6, shown is one embodiment of a control unit 60 utilized with the present invention. This embodiment of the control unit independently connects to the signal unit 100, the activation unit 80, and a power unit 70. However, other means of electrically connecting the various components of the present invention are also envisioned. The preferred connection takes place through a number of electrical connections 62, 64, 66.

In this embodiment, contained within a control unit housing 68, are the circuitry and means of controlling the present invention. Operation, in this embodiment, would be controlled through a circuit board, contained within the control unit housing 68. It is preferred that the circuit board be immersed in an epoxy by a process called "potting." Through such process, the epoxy cures and becomes hard, creating a total barrier to any environmental conditions. Operation of the present invention 50 can be performed through this control unit 60. For instance, the ability of the device to be activated and reactivated may be controlled through the control unit 60, the frequency of flashes of the light 104, the charging of the battery by a solar panel, the operation of activation unit lights, a timer, or other displays all may be specified in the control unit. Additionally, the control unit 60 may contain programmable circuitry, read-only memory (RAM), flash memory, etc., thereby allowing the user to program into the device additional features, timings, and options.

It is preferred that the device be able to be activated through the activation unit by a user. This would cause the light(s) 104 to blink, flash, or solidly illuminate for the driver of the bus, as had been previously specified. The light would deactivate itself after a predetermined period of time. For instance, the device could include a timer therein, for instance built into the control unit or into the activation unit which causes the light 104 to blink for thirty (30) seconds after the device is actuated by the passenger. Such a configuration would require the passenger to reactivate the device every one minute or so (or longer), but would help eliminate instances where a bus driver might stop at a blinking signal that a prankster walking by the bus stop had pressed minutes earlier.

The inventor also envisions the inclusion of other optional features to the present invention. For instance, an environmental sensor could be mounted on the housing 52 for monitoring environmental variables, such as temperature, etc. Another feature would be the real-time display of the bus' schedule. Referencing the buses global positioning system (GPS) signal with the GPS of the signaling device, an estimate of the estimated arrival time could be shown. Another feature would be the use of the present invention (with additional circuitry) for triangulating through global positioning satellites to find position of 911 calls. Another feature would be the addition of pinhole (or other) security cameras.

Figure 7:
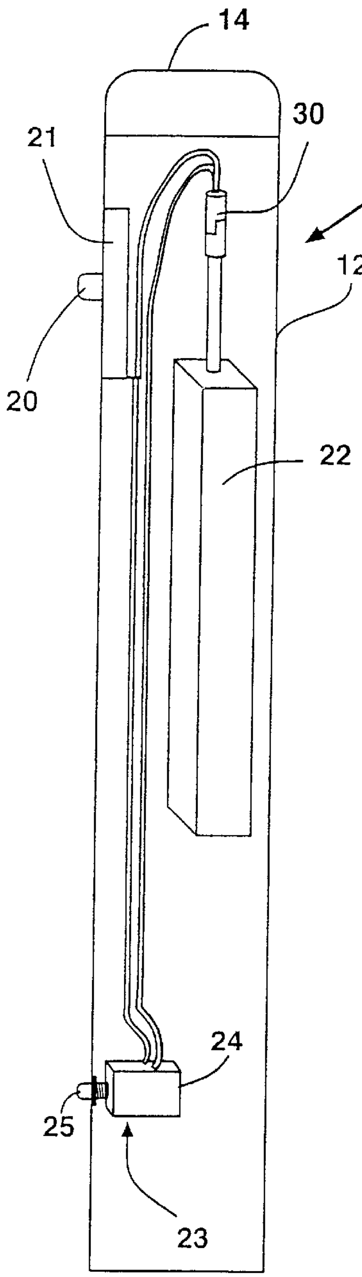
FIG. 7 is a perspective view of a third embodiment of the present invention.

Referring now to FIG. 7, a second embodiment of the present invention is shown. A signaling device 10 for signaling the driver of a bus, or other transportation system (i.e., taxis, etc.) that a passenger is awaiting pickup. The signaling device 10 is preferably contained within a housing 12. In this embodiment, the device 10 utilizes a tubular (hollow) housing 12 having a removable access panel 14. This housing 12, and the housing referred to earlier, can have any suitable shape in cross section, including but not limited to circular, oblong, triangular, quadrilateral, pentagonal, etc. The preferred housing is a length of 2 inch by 2 inch tubular steel.

It is preferred that the housing 12 have a removable access panel 14 which allows for easy maintenance of the device. In the embodiment shown, this panel 14 is at the top of the housing 12, however various suitable locations for such access is also envisioned. The term "panel" is not intended to necessarily imply something flat, and includes such things as threaded caps, press fit over a portion of the housing 12 for easy removal, or where the housing 12 is circular in cross-section the panel 14 and a portion of the housing 12 could be threaded to allow the panel 14 to be screwed on and off the housing 12.

The device 10 can be installed at a public transportation stop by any suitable means, for instance, by burying one end of the housing 12 in the ground, or by attaching one end of the housing to a concrete footing by means of nuts and bolts. However the device 10 is installed, it has been found to be desirable that the signal light 20 portion of the device 10 be located at or around nine (9) feet above ground level.

The device 10 has at least one signal light 20 or signaling means for viewing by a bus driver. Preferably, for protection and appearance, the electrical circuitry associated with the signal light is enclosed within the housing 12. As installed, the signal light 20 is preferably located on the side of housing 12 facing oncoming traffic so as to be visible to the bus driver approaching the stop where the signaling device 10 is located. It is preferred that the signal light 20 be located near the top of the housing 12, below an upper panel 14. The signal light 20 may be attached to the outside of the housing 12, be flush with the outside of the housing 12, or be recessed within the housing 12 having a port or other means for viewing the light therethrough.

The preferred signal light 20 is a light emitting diode (LED) type flashing light of the type used by bicyclists and joggers, and may be contained in a suitable signal light case 21. Such a signal light case 21 would be attached to the housing 12 by suitable attachment means. An example of a suitable light emitting diode type flashing light is manufactured by Selecta Switch as part number SL-AO5015CI. However, any suitable signal light means are also possible, including, but not limited to incandescent lights, florescent lights, lasers, plasma, neon, and other means of illumination.

In this embodiment, the external signal light 20 communicates with the interior of the housing 12 through a suitable opening in the housing 12. The signal light's extension through the opening is preferably watertight, for instance by placing the light inside a rubber grommet. Alternatively, the signal light 20 could be located behind the opening, within the housing 12 with the opening being covered by a transparent piece of glass, plastic, etc.

Figure 8:
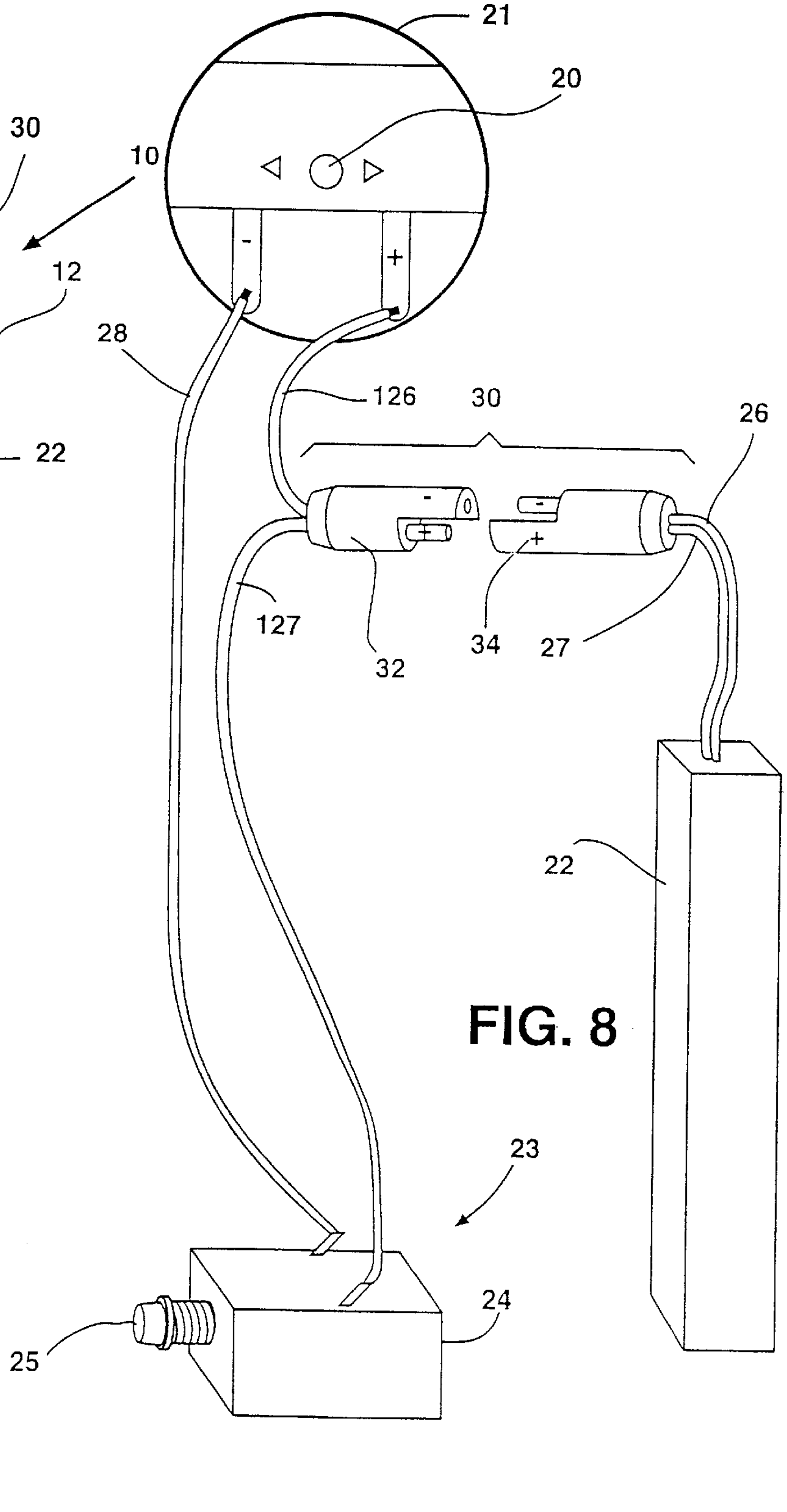
FIG. 8 is a partial, exploded view of the components shown in FIG. 6.

The signal light 20 is electrically connected to a power source. Shown in FIGS. 6 and 7 are the use of a battery pack 22 power source. It is preferred that the signal light 20 also connects to a means for actuating 23 the device, such as an electrical switch. It is preferred that suitable (e.g., 16 gage copper) wiring 26, 126, 27, 127, and 28 be used to connect the power source 22 to the signal light 20 to the means for actuating 23 the device 10. One possible electrical connection arrangement is illustrated in FIG. 8. For this embodiment, in the event the battery pack 22 becomes exhausted, a maintenance worker merely needs to remove or open the panel 14 from the housing 12, pulls wires 126, 127, and 28 toward the top, unplugs jacks 32 and 34 of connector 30, removes exhausted battery pack 22, and replaces the depleted battery pack 22 with a fresh battery pack 22 by reversing the foregoing steps.

Referring now to FIG. 8, a two pole polarized electrical connector member 30 having two mating jacks or plugs 32 and 34 connect the power source 22 to the signal light 20 and to the means for actuating 23 as shown in FIG. 7. Jacks 32 and 34 may be pulled apart for easy replacement of power source 22. The power source 22 is preferably a battery pack of the type that contains two "C" cell batteries. Although the signal light 20 of the invention is described as using a battery pack for its power source 22, if electric power is available to the location of device 10, a transformer could be used to step down the voltage of the available power to a suitable level. Other power sources, such as solar power, wind power, etc., are also envisioned.

In the embodiment shown in FIG. 7 and the embodiment shown in FIG. 8, the means for actuating 23 comprises a switch 24 having a button 25 that extends through an opening in the wall of the housing 12, as shown in FIG. 7, for easy access by a bus patron. Preferably, the button 25 will be located at an appropriate height for easy handicap access, e.g., about four feet from ground level after housing 12 is installed. A suitable push button switch is manufactured by Selecta Switch as part number AV191003C940N.

It is preferred that the switch 24 be an intermittent on/off type switch that is normally in the off position, and remains in the on position after the button 25 is depressed for only a limited period of time. Alternatively, switch 24 can be designed to activate the signal light 20 only for so long as the button 25 is depressed. The latter alternative prevents false signaling.

In use, a bus patron desiring to signal a bus scheduled to arrive in the near future merely depresses button 25. When button 25 is depressed to the "on" position, the circuit between battery pack 22 and signal light 20 is closed, and signal light 20 is activated. In an alternate embodiment, the signal light's activation could result in the flashing of the signal light. The driver of a bus approaching the bus stop will be able to see that the signal light 20 is flashing, and will thus know that a passenger is waiting to be picked up.

While there is shown and described the present preferred embodiment of the invention, it is to be distinctly understood that this invention is not limited thereto but may be variously embodied to practice within the scope of the following claims. It is also apparent that various changes may be made without departing from the spirit and scope of the invention as defined by the following claims.

I claim:

1. A signaling device for signaling a public transportation driver for installation in a transit site, comprising:

an activation unit, containing a switch, timing circuit for energizing a light emitting diode via an intermittent pulsing lighting circuit, said intermittent pulsing lighting circuit for alternately activating and deactivating said light emitting diode for a selected period of time, and electronics for controlling electricity to a light emitting diode;

a replaceable power unit which includes one or more batteries, for supplying power to said activation unit and a signal unit and said light emitting diode; and said signal unit including said light emitting diode positioned to point at an approaching transit driver to signal the presence of a passenger, which is powered by said replaceable power unit, and controlled by said activation unit; wherein said signaling device is configured for installation in a tubular post member, and when said switch in said control unit is activated by a passenger, said light emitting diode in said signal unit blinks at a rate determined by said intermittent pulsing lighting, for a period of time determined by said timing circuit.

2. The signaling device of claim 1 in which said signaling device is configured to be retrofitted in a preexisting tubular support member.

3. The signaling device of claim 1 in which said replaceable power unit is a battery pack.

4. The signaling device of claim 1 in which said activation unit, said replaceable power unit and said signal unit are in modular form and are configured for replacement of each module separately.

5. The signaling device of claim 1, wherein said power source is a battery pack located within said tubular post member.

6. The signaling device of claim 1, in which said power unit includes a solar energy collector.

7. The signaling device of claim 1 which further includes a time period selector, by which a user may determine said selected period of time for which said signal light is alternately activated and deactivated.

8. The signaling device of claim 1 which includes a sleep mode, which causes said signal light to draw power only when emitting light, and to not draw power when not emitting light.

9. A signaling device for signaling the presence of a passenger at a pickup location to a public transportation driver, said signaling device comprising:

a housing for housing said device, said housing mounted at said location;

a signal unit attached to said housing, said signal unit for displaying a signal to said driver when said device is activated;

a self-contained power source attached to said housing, said power source supplying power to said device; and an activation unit for allowing a user to activate said signaling device thereby causing the display of said signal by said signal unit for a predetermined period of time.

10. The signaling device of claim 9, wherein said signal unit is a light-emitting diode.

11. The signaling device of claim 10, wherein said light-emitting diode is configured to flash on and off when activated.

12. The signaling device of claim 9, wherein said self-contained power source is a battery pack.

13. The signaling device of claim 9, wherein said activation unit is an activation button.

14. The signaling device of claim 1, which further includes a Braille plate adjacent said activation unit for use by Braille readers.

15. The signaling device for signaling the presence of a passenger at a pickup location to a public transportation driver, said signaling device comprising:

a housing for containing said signaling device, said housing able to be attached to said location;

a battery pack for powering said signaling device, said battery pack located within said housing;

an activation unit for allowing a passenger to activate said signaling device, said activation unit attached to said housing;

a signal unit for displaying a signal light to said driver, indicating the presence of a passenger at said pickup location to said driver, said signal unit configured to display said signal light upon activation of said activation unit by said passenger, said signal unit attaching to said housing; and a control unit for controlling the operation of said signaling device, said control unit located within said housing, said control unit containing a timer;

wherein said control unit deactivates said signal unit after a selected interval of time, said control unit causing said signal light to flash on and off for said selected interval of time after said signal unit is actuated and in which said signal light is directed towards said driver and sized to signal said driver and not to light said pickup location.

16. The signaling device of claim 15, wherein said housing is a tubular signpost attached to a ground surface at said location.

17. The signaling device of claim 16, which further includes a tubular sign post cap in which said signal light is mounted for displaying said signal which is visible to said driver.

* * * * *